United States Patent
Matsuda et al.

(10) Patent No.: US 6,862,129 B2
(45) Date of Patent: Mar. 1, 2005

(54) ELECTROPHORETIC DISPLAY

(75) Inventors: Yojiro Matsuda, Kawasaki (JP); Hiroshi Matsuda, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/660,314

(22) Filed: Sep. 10, 2003

(65) Prior Publication Data

US 2004/0125433 A1 Jul. 1, 2004

(30) Foreign Application Priority Data

Sep. 10, 2002 (JP) ........................................ 2002-263993

(51) Int. Cl.$^7$ .............................................. G02B 26/00
(52) U.S. Cl. ...................... 359/296; 359/265; 359/266; 359/272
(58) Field of Search ................................ 359/296, 237, 359/250, 253, 265, 266, 267, 268, 269, 270, 271, 272, 273, 315; 345/107; 349/89, 155, 156, 158

(56) References Cited

U.S. PATENT DOCUMENTS

| 3,612,758 | A | | 10/1971 | Evans et al. | |
| 6,067,185 | A | | 5/2000 | Albert et al. | ............... 359/296 |
| 6,392,786 | B1 | * | 5/2002 | Albert | ......................... 359/296 |
| 6,542,284 | B2 | * | 4/2003 | Ogawa | ........................ 359/296 |
| 2003/0048521 | A1 | * | 3/2003 | Ikeda et al. | .................. 359/296 |
| 2004/0017349 | A1 | * | 1/2004 | Kawai | .......................... 345/107 |
| 2004/0027327 | A1 | * | 2/2004 | LeCain et al. | ............... 345/107 |
| 2004/0061927 | A1 | * | 4/2004 | Kanbe | ......................... 359/296 |

FOREIGN PATENT DOCUMENTS

| JP | 6-165775 | 6/1994 |
| JP | 2551783 | 8/1996 |
| WO | WO 00/03291 | 1/2000 |
| WO | WO 02/073304 A2 | 9/2002 |

* cited by examiner

Primary Examiner—Brandi N. Thomas
(74) Attorney, Agent, or Firm—Morgan & Finnegan, L.L.P.

(57) ABSTRACT

An electrophotographic display includes a plurality of microcapsules each encapsulating therein an insulating liquid and a plurality of charged electrophoretic particles dispersed in the insulating liquid, a first substrate and a second substrate disposed opposite to each other so as to sandwich the plurality of microcapsules, and a plurality of electrodes capable of being supplied with a voltage. A voltage is applied between the plurality of electrodes to move the charged electrophoretic particles between a first internal wall portion of each microcapsule an external surface of which contacts the first substrate and a second internal wall portion of each microcapsule an external surface of which is substantially out of contact with both the first and second substrate, thereby to switch a display state.

23 Claims, 11 Drawing Sheets

(a)

(b)

(a)

(b)

(c)

(d)

(a)

(b)

(a)

(b)

(c)

ELECTROPHORETIC DISPLAY

FIELD OF THE INVENTION AND RELATED ART

The present invention relates to an electrophoretic display (apparatus) for performing display by moving charged electrophoretic particles (charged migrating particles) and a process for producing the electrophoretic display.

With remarkable progress of digital technologies an amount of personally available information has been rapidly increased, so that low-power-consumption and thin-shaped display apparatuses have been developed actively as information output means.

One of such display apparatus has been proposed as an electrophoretic display by U.S. Pat. No. 3,612,758.

FIG. 11 shows an embodiment of a structure of the electrophoretic display D2. Referring to FIG. 11, the electrophoretic display D2 of the type includes a pair of substrates 1a and 1b oppositely disposed with a predetermined spacing, an insulating liquid 2 filled between these substrates 1a and 1b, a multitude of colored and charged electrophoretic particles 3 dispersed in the insulating liquid 2, and electrodes 14 and 15 disposed for each pixel A so as to be along the substrates 1a and 1b, respectively. In the electrophoretic display, the colored and charged electrophoretic particles are electrically charged to a positive or negative polarity, so that the particles are adsorved on either one of the electrodes 14 and 15 depending on a polarity of a voltage applied to the electrodes 14 and 15. However, the insulating liquid 2 and the charged electrophoretic particles 3 are respectively colored different colors, so that in the case where the charged electrophoretic particles 3 are adsorbed on the electrode 15 on a viewer side, the color of the charged electrophoretic particles 3 is visually recognized as shown in FIG. 11(a). On the other hand, in the case where the charged electrophoretic particles 3 are adsorbed on the other (opposing) electrode 14, the color of the insulating liquid 2 is visually recognized as shown in FIG. 11(b). Accordingly, by controlling the polarity of the applied voltage pixel by pixel, it is possible to effect display of various (picture) images.

However, such a electrophoretic display is accompanied with a problem such that a display irregularity liable to occur due to mutual agglomeration or localization of the colored and charged electrophoretic particles 3.

In order to solve the problem, Japanese Patent Publication (JP-B) No. 2551783 has disclosed a method wherein a disperse system comprising the insulating liquid 2 and the colored and charged electrophoretic particles 3 is encapsulated to form microcapsules within which the disperse system has been encapsulated in advance, and a binder material filling a space between microcapsules and being sealed together with the microcapsules between the pair of substrates, and can remedy the above-described display irregularity problem. Further, according to this microencapsulation method, it becomes possible to simplify a time-consuming and troublesome production process such that a volatile disperse system is uniformly encapsulated between the pair of substrate, thereby to realize a reduction in production costs.

Further, International Publication No. WO 00/03291 has proposed a display scheme wherein microcapsules are disposed in alignment (registration) with electrodes and charged electrophoretic particles are moved along a substrate surface to effect display. FIGS. 12(a) and (b) each shows a sectional structure of a pixel of such a display scheme, and FIG. 12(c) shows a corresponding plan view. FIGS. 12(a) and (b) are views illustrating a state that electrophoretic particles 50 are collected on the surface of a narrower electrode 30 and a state that the electrophoretic particles 50 are distributed over the surface of a wider electrode 40, respectively. By disposing one microcapsule 20 for one pixel, it is possible to cause the electrophoretic particles 50 to migrate in a lateral direction (along the substrate surface). As a result, when an electrophoretic liquid is transparent, it becomes possible to realize a black-and-white or color display based on a colored electrode surface. In the case of the black-and-white display, it is possible to switch a display mode by moving the electrophoretic particles 50 which are colored black within the microcapsules between a black-colored electrode 30 and a white-colored electrode 40.

In the above-mentioned electrophoretic displays, however, the insulating liquid is required to be colored by mixing a color former, such as dyes or ions, into the insulating liquid. As a result, donation and acceptation of electric charges due to the color former used as caused to occur, thus adversely affecting an electrophoretic operation of the charged electrophoretic particles to cause a problem such that the life or stability of the electrophoretic display as a display apparatus is lowered. Further, by the coloring of the insulating liquid, the dye within the insulating liquid is adsorbed onto the charged electrophoretic particles to lower a display contrast. In addition, as shown in FIG. 11(a), in the case where the colored and charged electrophoretic particles 2 are adsorbed on the electrode 15 disposed on the viewer side and are visually recognized, the colored insulating liquid enter a space between the charged electrophoretic particles 3 and the electrode 15. As a result, a high contrast state is not readily realized.

Further, the conventional electrophoretic displays employ the transparent insulating liquid 25 as shown in FIG. 12 but include a substrate on which each pixel is constituted by arranging two electrodes 30 and 40. As a result, the electrode 30 identical in color to the charged electrophoretic particles is required to occupy a predetermined planar area in which a brightness of a display surface is impaired, thus also resulting in less realization of high contrast state.

Further, a plurality of pixels each having a such a structure are arranged, so that the electrodes 30 and 40 create an electric field also with electrodes 30 and 40 of an adjacent pixel. More specifically, an electric field created within one microcapsule is leaked to an adjacent microcapsule, thus adversely affecting movement of the charged electrophoretic particles within the microcapsules.

SUMMARY OF THE INVENTION

The present invention has been accomplished in order to solve the above-described problems.

An object of the present invention is to provide an electrophoretic display which is excellent in display stability and is capable of realizing high-contrast display.

Another object of the present invention is to provide a production method of the electrophoretic display.

According to the present invention, there is provided an electrophotographic display, comprising:

a plurality of microcapsules each encapsulating therein an insulating liquid and a plurality of charged electrophoretic particles dispersed in the insulating liquid, a first substrate and a second substrate disposed opposite to each other so as to sandwich the plurality of microcapsules, and a plurality of electrodes capable of being supplied with a voltage, wherein a voltage is applied between the plurality of electrodes to move the charged electrophoretic particles between a first internal wall portion of each microcapsule an external surface of which contacts the first substrate and a second internal wall portion of each microcapsule an external surface of which is substantially out of contact with both the first and second substrates, thereby to switch a display state.

In a preferred embodiment of the present invention, the plurality of electrodes comprise a first electrode disposed along the first substrate and a second electrode which is electrically isolated from the first electrode and is disposed at least a part of a space enclosed with the first and second substrates and the surfaces of microcapsules.

According to the present invention, there is also provided a process for producing an electrophoretic display including a plurality of microcapsules each encapsulating therein an insulating liquid and a plurality of charged electrophoretic particles dispersed in the insulating liquid, a first substrate and a second substrate disposed opposite to each other so as to sandwich the plurality of microcapsules, a first electrode disposed along the first substrate and a second electrode which is electrically isolated from the first electrode and is disposed at least a part of a space enclosed with the first and second substrates and the surfaces of microcapsules; the process comprising:

(1) a step of forming the first electrode on the first substrate, (2) a step of disposing the plurality of microcapsules on the first or second substrate, (3) a step of disposing the first and second substrate so as to sandwich the plurality of microcapsules, and (4) a step of forming the second electrode in a space between adjacent microcapsules before or after the step (3).

According to the present invention, there is further provided a process for producing an electrophoretic display including a plurality of microcapsules each encapsulating therein an insulating liquid and a plurality of charged electrophoretic particles dispersed in the insulating liquid, a first substrate and a second substrate disposed opposite to each other so as to sandwich the plurality of microcapsules, a first electrode disposed along the first substrate and a second electrode which is electrically isolated from the first electrode and is disposed at least a part of a space enclosed with the first and second substrates and the surfaces of microcapsules; the process comprising:

a first step of preparing a laminated structure including an insulating layer and a projection-shaped electroconductive member, as the second electrode, disposed on the insulating layer by forming the electroconductive member at a recess of a mold substrate, laminating the insulating layer on the electroconductive member, and removing the laminated structure from the mold substrate, a second step of disposing the plurality of microcapsules so that the projection-shaped electroconductive member is located between adjacent microcapsules, and a third step of bonding the first and second substrates to each other by using the laminated structure, in which the microcapsules are disposed, as the first or second substrate.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

First, a representative embodiment of the electrophoretic display according to the present invention will be described with reference to FIG. 1.

Figure 1:
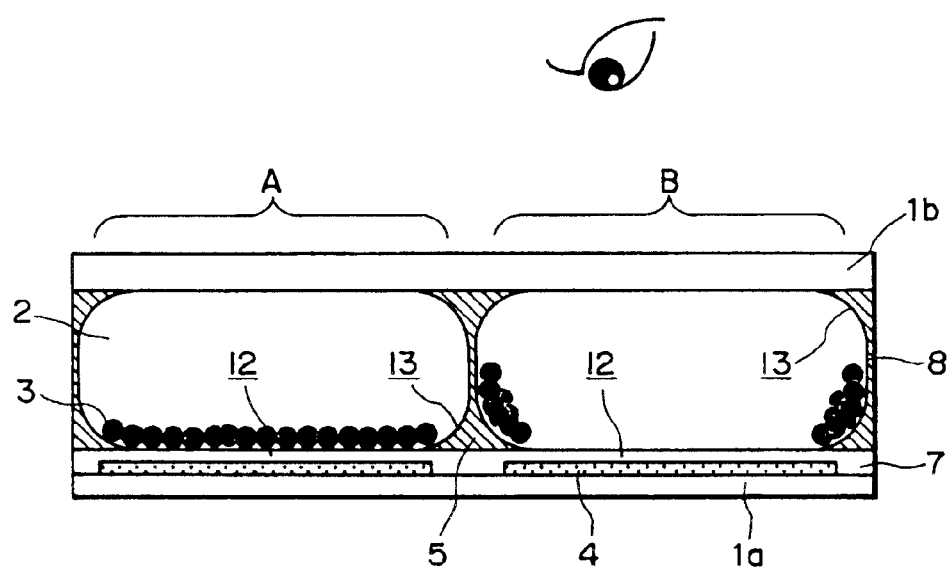
FIGS. 1, 2(a), 2(b), 3(a), 3(b), 3(c), 4(a), 4(b), 4(c), 5(a), 5(b), 6(a) and 6(b) are respectively a schematic sectional view showing an embodiment of a representative structure of the electrophoretic display according to the present invention.

Referring to FIG. 1, the electrophoretic display includes two pixels consisting of pixel A and pixel B, a pair of substrates 1a and 1b disposed opposite to each other with a predetermined spacing, and a plurality of microcapsules 8 disposed between the substrates 1a and 1b. In each microcapsule 8, an insulating liquid 2 and a plurality of charged electrophoretic particles 3 dispersed in the insulating liquid are encapsulated. Further, a first electrode 4 capable of applying a voltage to each pixel is disposed on and along either one of the substrate 1a or 1b (the substrate 1a in this embodiment). Hereinafter, for convenience of explanation, the substrate on which the first electrode 4 is disposed is referred to as a "first substrate 1a" and the other substrate is referred to as a "second substrate 1b".

In the case of black-and-white display (monochrome display), the first electrode 4 is colored white and a second electrode and the charged electrophoretic particles 3 are colored black, in advance. When two display states are provided by utilizing transmission and interruption of light in combination with a light source (backlight) disposed behind the electrophoretic display, the first electrode 4 is made transparent and the second electrode and the charged electrophoretic particles 3 are made opaque. However, the display mode of the electrophoretic display according to the present invention is not limited to these display modes. Other display modes applicable to the present invention are described later.

Referring to FIG. 1, the plurality of microcapsules 8 are disposed along the first substrate 1a, i.e., are arranged side by side i one layer without overlapping each other, and the second electrode is disposed in a space 5 enclosed or defined by the outer surfaces of adjacent microcapsules 8 and the first and second substrates 1a and 1b (indicated by oblique lines in FIG. 1).

In this embodiment (FIG. 1), the second electrode is formed with an electroconductive member filled in the space 5 between the plurality of microcapsules 8. The microcapsules 8 are ordinarily spherical, so that such a space 5 is left inevitably when the microcapsules 8 are sandwiched by the first and second substrate 1a and 1b. When the space 5 is filled with the second electrode, an electric field is created only within each microcapsule 8 at the time of applying a voltage to the electrodes, so that the resultant electric field can be utilized in the most effective manner possible. As a result, the applied voltage is not required to be a higher value than is necessary.

However, the second electrode is not limited to such a structure but may be modified into those described later.

The electrophoretic display of the present invention is characterized in that a display mode is switched by moving the charged electrophoretic particles 3 between an internal wall portion of each microcapsule 8 a corresponding surface of which contacts the first substrate 1a and an internal wall portion of each microcapsule 8 a corresponding surface of which is substantially out of contact with both the first and second substrates 1a and 1b and constitutes a side wall portion of the microcapsule 8.

Herein, the "external surface of which is substantially out of contact with both the first and second substrates 1a and 1b" principally refers to an external or outer surface portion corresponding to a side wall portion of each microcapsule 8 located between the first and second substrates 1a and 1b but may inclusively refer to such an external surface portion that a direction and strength of electric field thereat are substantially identical to those at the external surface portion corresponding to the microcapsule side wall portion even when the portion almost contacts the first substrate 1a or the second substrate 1b.

In this embodiment, the microcapsules 8 are ordinarily formed in a spherical shape in its preparation step but when the microcapsules 8 are disposed on the substrate and are compressed between the pair of first and second substrate 1a an 1b, the resultant microcapsules 8 are deformed to assume a (partially) flattened shape. At that time, a part of the external surface of the respective microcapsules 8 contacts the first substrate 1a, another part thereof contacts the second substrate 1b, and a remaining part of the external surface, of the respective microcapsules 8, which is substantially out of contact with both the first and second substrates 1a and 1b, contacts the electroconductive member 6 as the second electrode.

As a result, when the charged particles within the respective microcapsules are attracted to the first electrode of the first substrate almost thereof are moved to an internal wall portion of each microcapsule, an external surface of which contacts the first electrode and also gather at an internal wall portion where a corresponding external surface does not completely contact the first electrode but an electric field thereat is substantially equal to that at the first electrode. On the other hand, when the charged particles are attracted to the second electrode, almost thereof gather at an internal wall portion of each microcapsule, an external surface of which contacts the second electrode and also gather at an internal wall portion where an electric field thereat is substantially equal to that at the second electrode.

In the case where the charged particles are attracted to the first electrode, the first electrode is disposed on the first substrate in a wider area, so that the charged particles are distributed over a corresponding internal wall portion. However, in the case where the charged particles are attracted to the second electrode, the charged particles come into sight in such a state that the charged particles gather in a narrower area at a peripheral side wall portion of each microcapsule when viewed from the display surface side. Accordingly, it becomes possible to realize a high-contrast display using these two display states.

The second electrode is disposed in the space surrounding the side wall portion of each microcapsule, so that a strong electric field is also created in the vicinity of the second substrate to hold the charged electrophoretic particles at a corresponding internal wall portion of each microcapsule.

At the pixel A shown in FIG. 1, when the charged electrophoretic particles are moved to an internal wall portion of microcapsule, an external surface of which contacts the first substrate, the charged electrophoretic particles are distributed widely over the internal wall portion, so that an area occupied by the charged electrophoretic particles becomes larger when the electrophoretic display is viewed in the display direction, i.e., in a direction perpendicular to the substrate.

On the other hand, at the pixel B shown in FIG. 1, when the charged electrophoretic particles are moved to an internal wall portion of microcapsule, an external surface of which is substantially out of contact with both the first and second substrates and constitutes a side wall of the microcapsule, the charged electrophoretic particles gather together along the inner wall surface of the side wall of the microcapsule apart from the substrates. As a result, ideally the charged electrophoretic particles are distributed over an entire space from the first substrate to the second substrate within the microcapsule, so that a degree of overlapping in the direction perpendicular to the substrates becomes large, thus resulting in a smaller area in the direction perpendicular to the substrates.

Accordingly, when one of the above two states is set to a white display state and the other state is set to a black display state, one mode allows such a display state that the charged electrophoretic particles are distributed for display in the widest area possible and the other mode allows such a state that the charged electrophoretic particles are accumulated for display in the narrowest area possible. For this reason, the area for displaying white is made larger, thus achieving a bright display state. Further, a contrast, i.e., a ratio between the two display states can be made maximum in a scheme wherein a display state is switched by moving the charged electrophoretic particles in the substrate surface direction.

Figure 12:
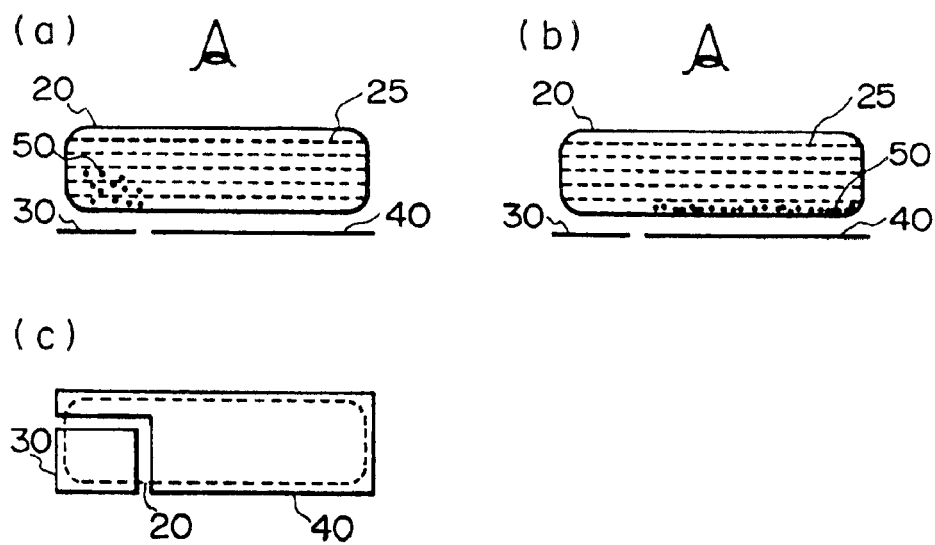
FIGS. 12(a)–12(c) are schematic views showing a sectional structure (a) and (b) and a planar structure (c) of another embodiment of the conventional display apparatus.

On the other hand, in the pixel structure shown in FIGS. 12(a) and 12(b), the electrodes 30 and 40 are disposed on the same substrate surface, so that an electric field is very weak at an internal wall portion of microcapsule opposite to that closer to the attract and hold the charged electrophoretic particles. As a result, the charged electrophoretic particles are held only in the vicinity of the electrodes, so that a degree of overlapping is lesser than the state shown at the pixel B of FIG. 1 even when the charged electrophoretic particles are accumulated on the narrower electrode 30 as shown in FIG. 12(a), thus resulting in a wider planar area occupied by the charged electrophoretic particles. Consequently, a planar area of the other wider electrode 4 becomes narrower, so that a brightness in the bright state is not increased when compared with the pixel structure of FIG. 1, thus failing to increase a contrast.

Next, a display scheme employed in the present invention will be described.

Referring to FIG. 1, when the charged electrophoretic particles are moved to the position which covers (overlaps) the first electrode, the color of the charged electrophoretic particles is visually recognized through the transparent insulating liquid (at the pixel A). Further, when the charged electrophoretic particles covering the first electrode are moved to the side wall of the microcapsule, the color of the first electrode or the first substrate is visually recognized (at the pixel B). For example, when the charged electrophoretic particles are colored black and the first electrode is colored white, it is possible to realize the black-and-white display (hereinafter, for convenience of explanation, the charged electrophoretic particles are in the black-colored state and the first electrode is in the white-colored state, unless otherwise specified). It should be noted, however, that the combination of coloring is not limited thereto but may be modified appropriately. Further, in the case of effecting color display, e.g., the charged electrophoretic particles are colored black and the first electrode is appropriately colored red, green, blue, cyan, magenta or yellow. The coloring method of the first electrode may include:

(a) one wherein the first electrode parse is colored, (b) one wherein a coloring layer is formed separately from the first electrode, and (c) one wherein an insulating liquid which is formed so as to cover the first electrode is utilized (e.g., a method in which the color of the insulating liquid per se is utilized or a coloring material is mixed into the insulating liquid).

As another color display method, it is possible to use the charged electrophoretic particles which are appropriately colored red, green, blue, cyan, magenta and/or yellow.

Figure 2:
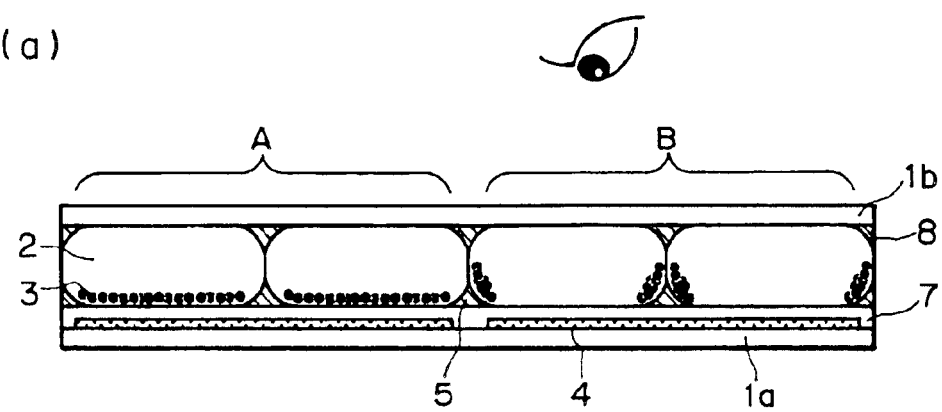
Figure 2:
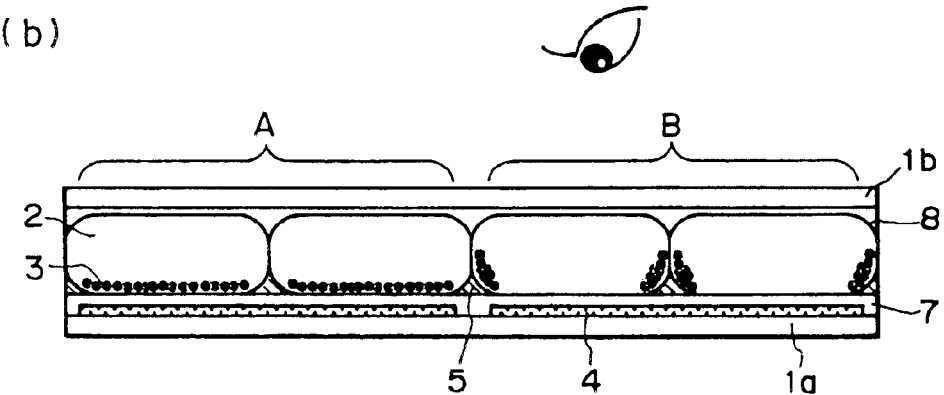

In this embodiment (FIG. 1), the number of microcapsules disposed for one pixel is one but is not limited thereto. For example, the number of microcapsules disposed for each pixel may be changed to two as shown in FIG. 2(a) or three or more.

Further, the microcapsules used in the present invention may preferably be formed in a (partially) flattened shape along the substrates, whereby at the time of white display (at the pixel B of FIG. 1), it is possible to increase a planar areal ratio between the white display electrode and the black charged electrophoretic particles when viewed from a viewer on the substrate 1b side. As a result, a high-contrast display can be realized.

Hereinbelow, other constituents or structural members of the present invention will be described.

(Second Electrode)

The second electrode used in the present invention is disposed in a space between a microcapsule and an adjacent microcapsule, so that the second electrode may also function as a second electrode for the adjacent microcapsule. Accordingly, a potential of the second electrode may ordinarily be set to a level in common with all the pixels, whereby it is possible to prevent an occurrence of interference in terms of movement of charged electrophoretic particles between adjacent microcapsules due to leakage of an electric field from the microcapsule to the adjacent microcapsule.

As described above, the second electrode is disposed in a space between plural microcapsules in the present invention but may be disposed in the entire space between the microcapsules or disposed on a part of the space only or one of the substrates. In the latter case, an effect of attracting the charged electrophoretic particles to the entire side walls of the microcapsules becomes smaller but an effect of electrically shielding adjacent microcapsules is sufficiently ensured. Further, the second electrode may be formed as a separate member in the space between the adjacent microcapsules without being filled in the space or disposed in any position in the neighborhood of the substrate(s). Further, the constitution (structure) of the second electrode is also not particularly limited.

FIG. 2(a) shows a structure of the electrophoretic display wherein the second electrode is formed with a electroconductive member which is filled in the entire space between the plurality of microcapsules. The electroconductive member is colored black similarly as in the charged electrophoretic particles but may be colored another color in the case of color display. Alternatively, the second electrode is made optically transparent in some cases in order to improve a viewing angle characteristic.

The second electrode may be filled in not only the entire space between the microcapsules as shown in FIGS. 1 and 2(a) but also a part of the space as shown in FIG. 2(b). Alternatively, the second electrode may be formed at all or a part of an external wall of the microcapsule side wall portion.

Figure 3:
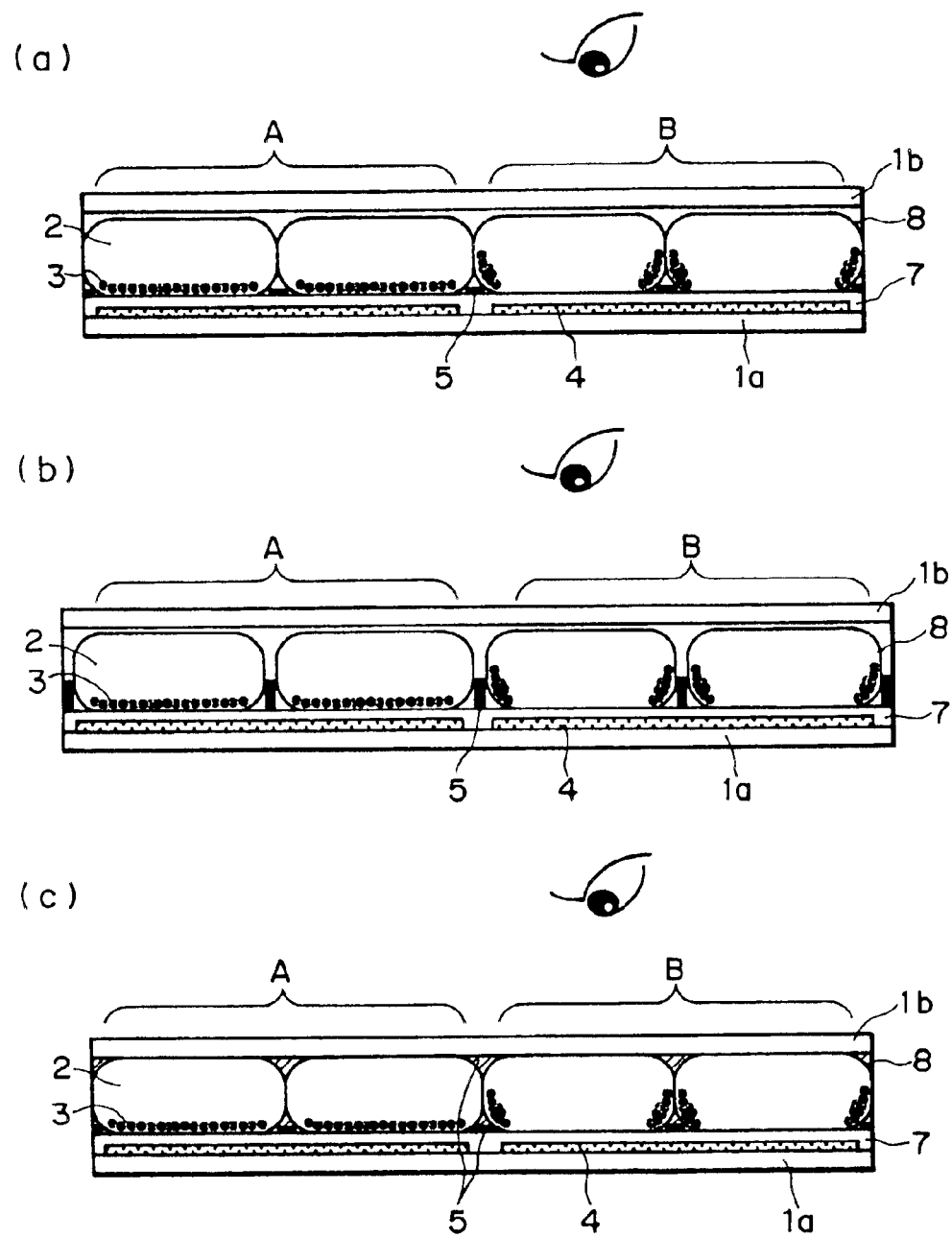

Further, as another example, the second electrode may be formed on the surface of the first substrate which defines the space between the adjacent microcapsules as shown in FIG. 3(a). The second electrode may also be formed in a projected shape toward the second substrate side on the first substrate surface defining the space between the adjacent microcapsules as shown in FIG. 3(b). The projected shape of the second electrode is not restricted to that shown in FIG. 3(b). As another example, the second electrode may be formed, on the first substrate surface defining the space between the adjacent microcapsules, with an electroconductive member filled between the space as a part of the electroconductive member, as shown in FIG. 3(c). In such a case, it is possible to effect electrical addressing to the electroconductive member filled in the space with reliability by the second electrode formed on the first substrate. Further, by utilizing the second electrode formed on the first substrate, it is possible to form the electroconductive member in the space between the microcapsules according to electroplating.

As still other examples, in the electrophoretic display, a projected-shaped member is formed on the first substrate surface which contacts the space between the plurality of microcapsules, and the second electrode may be formed on, under or within the projected-shaped member as shown in FIGS. 4(a), 4(b) and 4(c), respectively. The shape of the projected member is not limited to those shown in FIGS. 4(a)–4(c).

In the present invention, the second electrodes and the projected-shaped members including the second electrodes 1b shown in FIGS. 3(a) to 3(c) and 4(a) to 4(c) may be formed on the second substrate in place of the first substrate 1a. In these cases, it is necessary to effect a positional alignment (registration) of the second electrode relative to the first electrode at the time of bonding of the first substrate to the second substrate.

In the electrophoretic display of the present invention, the second electrode is not necessarily disposed at the space between all the microcapsules. For example, as shown in FIG. 5(a), a plurality of microcapsules are disposed within one pixel (pixel A or pixel B) and the second electrode may be disposed at a boundary between the adjacent pixels A and B.

(First Electrode)

Figure 5:
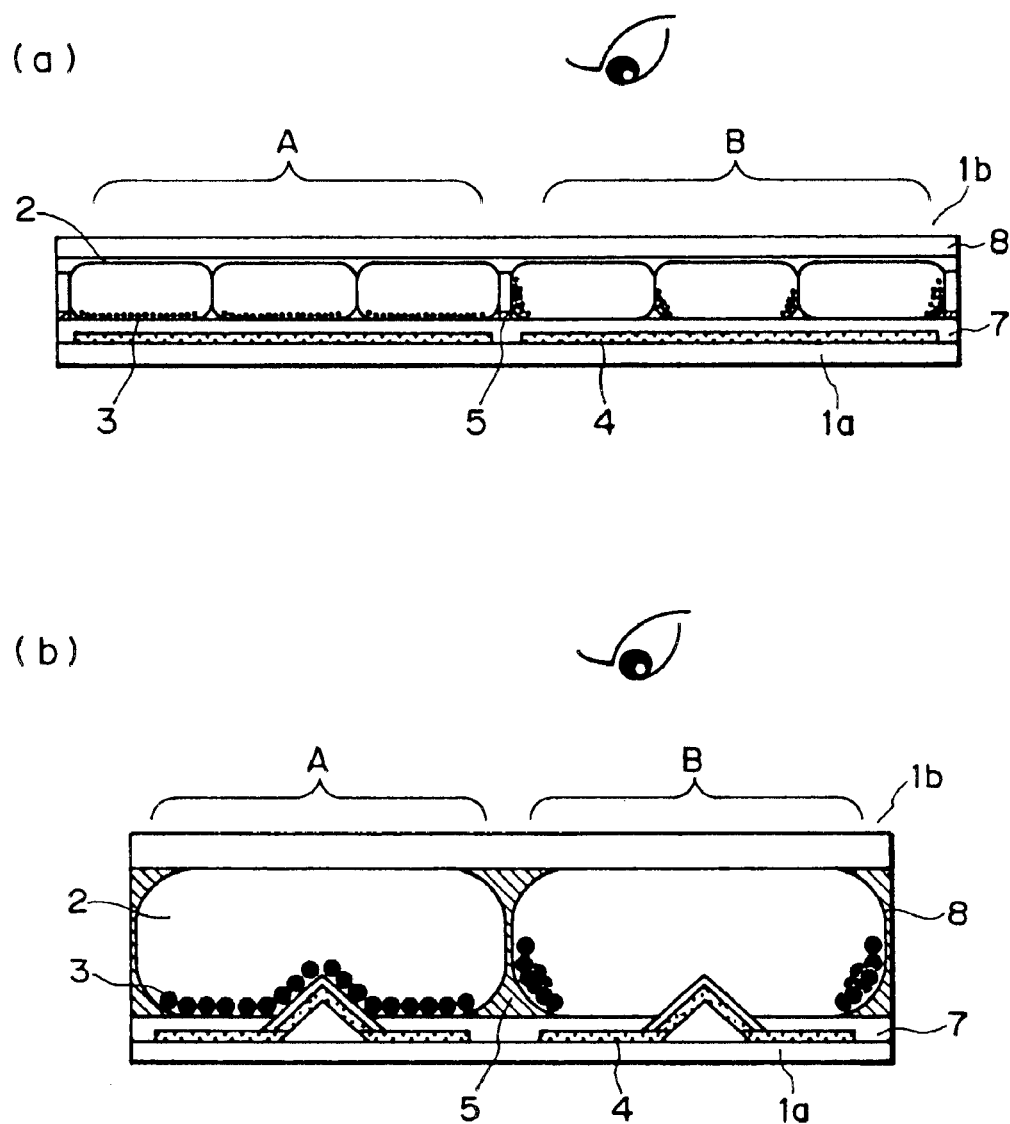

In the above-mentioned examples, the first electrode is ia planar electrode disposed along the first substrate surface, but as shown in FIG. 5(b), al or a part of the first electrode may be formed in a projected shape toward the second substrate side. By the projected-shaped first electrode, an electric field vector at a central portion of the first electrode is effectively directed toward the second electrode direction, thus allowing a smooth movement of the charged electrophoretic particles and reduction of drive voltage. The projected shape of the first electrode is not particularly limited so long as it is such a shape that the central electric field vector of the first electrode is directed in the direction of the second electrode. A minimum height of the projected shape may preferably be not less than 0.5 μm, more preferably not less than 2 μm. On the other hand, a maximum height thereof may very depending on a distance (gap) between the first and second substrate but may preferably be not more than the gap between the substrates, more preferably be not more than ⅔ of the gap between the substrates.

(Arrangement of Microcapsules)

Figure 6:
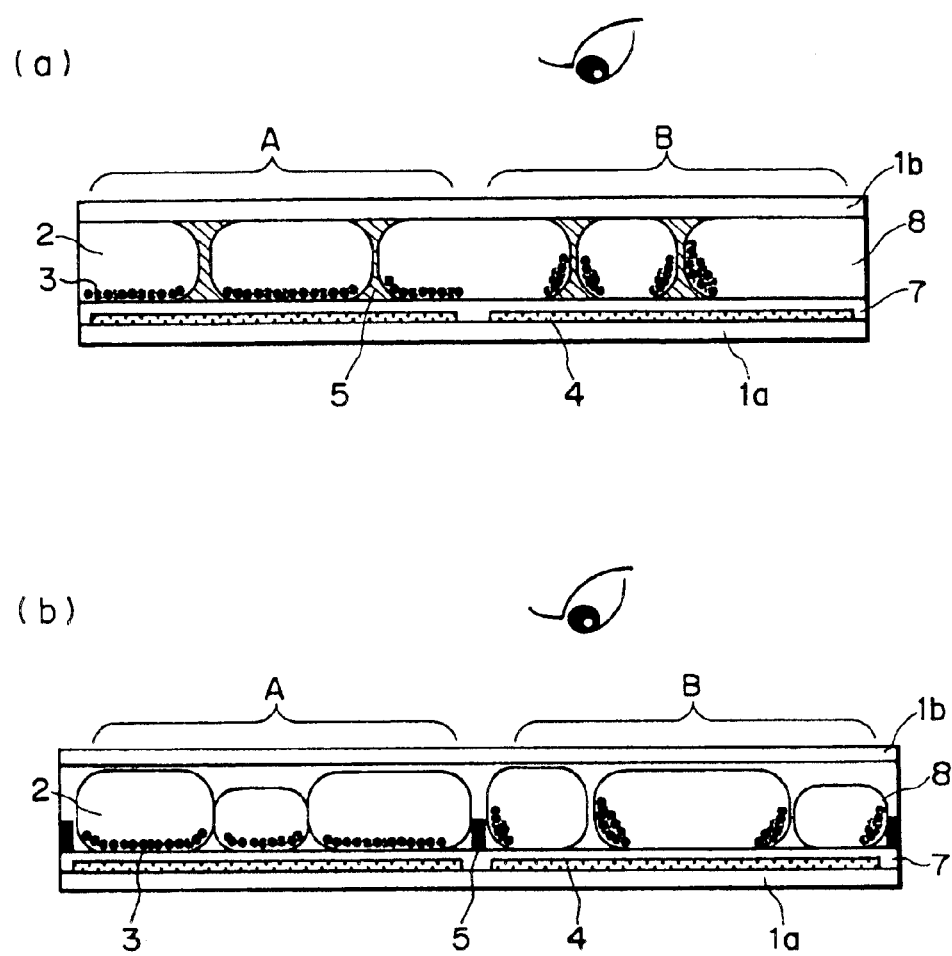

In the electrophoretic display of the present invention, it is essentially unnecessary to positionally align each microcapsule with a corresponding first electrode and also to uniformize the size of microcapsules as shown in FIGS. 6(a) and 6(b). As shown in these figures, in the present invention, the microcapsules can be disposed irrespective of the position of the first electrode, thus being advantageous in terms of ease of production.

On the other hand, the position of a microcapsule may be in alignment with that of an associated first electrode. In this case, compared with the case where the positions of the microcapsule and the first electrode are out of alignment with each other, an occurrence of operation failure within a microcapsule disposed over adjacent two first electrode (adjacent two pixels) can be minimized.

In the present invention, in the case where the second electrode is formed in the shape projected toward the second substrate side or formed on or within the projected-shaped member, the microcapsules can be readily disposed in alignment with a predetermined position. For example, when the microcapsules are disposed in a predetermined position by an ink jet method, positioning of the microcapsules in the predetermined position can readily be performed based on the projected shape of the second electrode used, thus being remarkably improved in positioning efficiency. The positioning of the microcapsules can be effected by using printing techniques such as screen printing and gravure printing, or a technique such as FSA (fluidic self-assembly). In addition to the above techniques, it is also preferable to electrically assist the positioning of the microcapsules by applying a predetermined voltage to the first and second electrodes.

(Opposing (Counter) Electrode)

In the electrophoretic display of the present invention, it is preferable to dispose a third electrode on the second substrate. If the charged electrophoretic particles are moved in the direction of the second substrate and are attached to the side walls of the microcapsules which contact the second substrate, a resultant display contrast is lowered. In order to suppress the lowering in contrast, it is possible to prevent movement of the charged electrophoretic particles in the second substrate direction by applying a voltage of a polarity identical to the charged electrophoretic particles to the third electrode. For example, in the case where the charged electrophoretic particles are positively charged, a positive-polarity voltage is applied to the third electrode on the second substrate, whereby the movement of the charged electrophoretic particles toward the second substrate can effectively be suppressed.

Production Processes

First, materials for respective members constituting the electrophoretic display of the present invention shown in FIG. 1 will be explained.

For the first substrate 1a and the second substrate 1b it is possible to use inorganic materials inclusive of polymer films, such as polyethylene terephthalate (PET) and polyether sulfone (PES); glass; and quartz.

As the first electrode 4, it is possible to use any material if it is an electroconductive material capable of being patterned.

Further, as the insulating layer 7 which covers the first electrode 4, it is preferable to use a low-dielectric constant material which does not readily cause pinhole even if it is formed in a thin film, specifically amorphous fluorine-containing resin, high transparent polyimide, PET, etc.

As the insulating liquid 2, a colorless transparent liquid, such as silicone oil, toluene, xylene or high-purity petroleum, may be used.

As the charged electrophoretic particles 3, it is possible to use particles of a material, which exhibits a good charge characteristic in the insulating liquid 2, such as polyethylene or polystyrene. In the case of using black particles, carbon black may preferably be mixed in the above resin. A particle size of the charged electrophoretic particles 3 is not particularly limited but may preferably be 0.5–10 μm.

In the present invention, the insulating liquid 2 and the plurality of the charged electrophoretic particles 3 dispersed in the insulating liquid 2 are micro-encapsulated by an appropriate method, such as interfacial polymerization, insolubilization reaction, phase separation or interfacial precipitation. The size of the microcapsules may preferably be several ten microns to several hundred microns.

(Production Process 1)

A first production process for the electrophoretic display (display apparatus) of the present invention is shown in FIGS. 7(a) to 7(c).

First, the first electrode 4 is formed on the first substrate 1a and is coated with the insulating layer 7 by using a known method, such as printing or photolithography. Then, the microcapsules 8 are disposed on the first substrate 1a (FIG. 7(a)). At this time, the microcapsules 8 are disposed in positional alignment with the first electrode while keeping a predetermined space between adjacent microcapsules by using a method, such as an ink jet method, a screen printing method or a gravure printing method.

On the microcapsules 8, the second substrate 1b is placed to sandwich the microcapsules 8 between the first and second substrates 1a and 1b, and an appropriate pressure is applied between the pair of substrates 1a and 1b. As a result, the microcapsules 3 are deformed in a flattened form and are caused to approach each other so as to leave a predetermined space (FIG. 7(b)).

Thereafter, in the space between adjacent microcapsules 8, a liquid electroconductive member 5 is filled by utilizing a capillary action (FIG. 7(c)). The electroconductive member 5 may be formed only with an electroconductive material or by mixing the electroconductive material into an insulating base material. As the electroconductive material, it is preferable to use an electroconductive polymeric material which is liquid and exhibits fluidity or the electroconductive polymeric material colored with a dye. It is further preferable to impart a property of being curable by heating or light irradiation to the electroconductive member 5. In the case of using such curable electroconductive member 5, the curable electroconductive member 5 is appropriately cured by heating or light irradiation to form the second electrode. By sealing the periphery of the pair of substrate, it is also possible to use the liquid electroconductive member 5 as the second electrode.

(Production Process 2)

A second production process of the electrophoretic display of the present invention includes a step shown in FIG. 7(d) in addition to the first production process described above.

As a first step, similarly as in the first production process, the microcapsules 8 are disposed on the first substrate 1a and sandwiched between the first and second substrate 1a and 1b by placing the second substrate 1b on the microcapsules 8 (FIG. 7(a)). Thereafter, the microcapsules 8 are partially flattened by applying an appropriate pressure between the pair of substrates 1a and 1b (FIG. 7(b)).

Then, as a second step, also similarly as in the first production process, the electroconductive member 5 is filled in the space between adjacent microcapsules created in the first step under the action of capillary phenomenon (FIG. 7(c)).

Then, as a third step, the pair of substrates are pressed to further flatten the microcapsules so that the plurality of microcapsules arranged in substantially parallel with each other along the substrates are substantially brought into surface contact with each other (FIG. 7(d)).

(Production Process 3)

Figure 8:
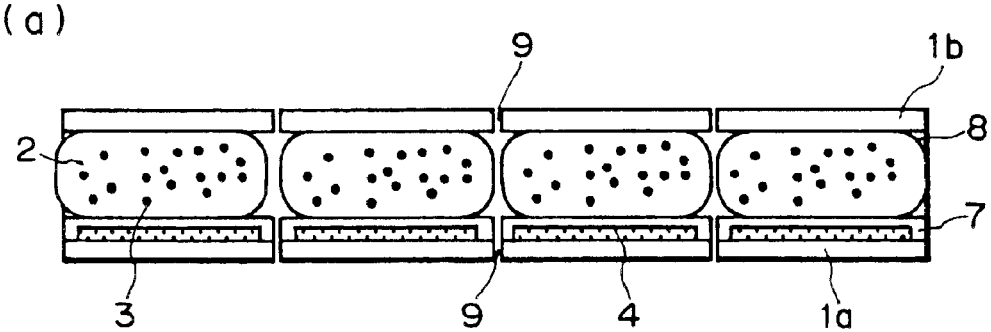
Figure 8:
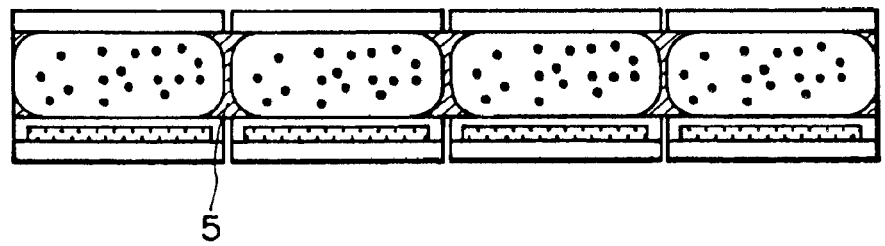

FIGS. 8(a) and 8(b) show a third production process of the electrophoretic display of the present invention.

Each of microcapsules 8 is disposed between the first and second substrates 1a and 1b and either one or both of the first and second substrates 1a and 1b are provided with an injection port 9 for the electroconductive member 5 (FIG. 8(a)). In this embodiment, the injection port 9 is located in the space between adjacent microcapsules 8 arranged along the first substrate 1a. Then, from the injection port 9, the electroconductive member 5 is injected in the space between adjacent microcapsules 8 to form the second electrode (FIG. 8(b)).

(Production Process 4)

FIGS. 9(a) to 9(c) show a fourth production process of the electrophoretic display of the present invention.

A plurality of microcapsules 8 are disposed on the first substrate 1a. In this instance, on the surface of the first substrate 1a, a plating electrode 51 has been formed, in advance, in addition to the first electrode 4 and the insulating layer 7 (FIG. 9(a)).

The resultant structure is then immersed into a plating liquid to cause metal plating using the electrode 51 as an electrode for metal plating, thus forming therein the second electrode 5 (FIG. 9(b)). As the electroconductive member, a metal capable of being formed through plating, such as Ni, Au, Pt, Ag, Cu or Cr may suitably be used. Finally, the second substrate 1b is bonded to the structure (FIG. 9(c)).

(Production Process 5)

On a second substrate 1b, an electrode and a plurality of microcapsules 8 are disposed, followed by metal plating similarly as in Production process 4 to form a second electrode. Thereafter, a first substrate 1a on which a first electrode is formed is bonded to the first substrate 1b so as to sandwich the microcapsules 8 therebetween.

(Production Process 6)

A sixth production process of the electrophoretic display of the present invention is shown in FIGS. 10(a) to 10(e).

Different from the first to fifth production processes wherein the second electrode is formed after arrangement of the microcapsules on the substrate, in this production process, a projected-shaped second electrode is formed in advance on a mold substrate and each microcapsule is disposed between the adjacent second electrodes.

In a first step, a mold substrate 10 provided with recess portions 52 disposed so as to correspond to a space between adjacent microcapsules to be formed, is prepared (FIG. 1(a)). In the recess portions 52 of the mold substrate 10, an electroconductive layer 5 to be used as the second electrode is formed on the mold substrate 10. On the electroconductive layer 5, an insulating layer 71 is formed (FIG. 10(b)).

Figure 10:
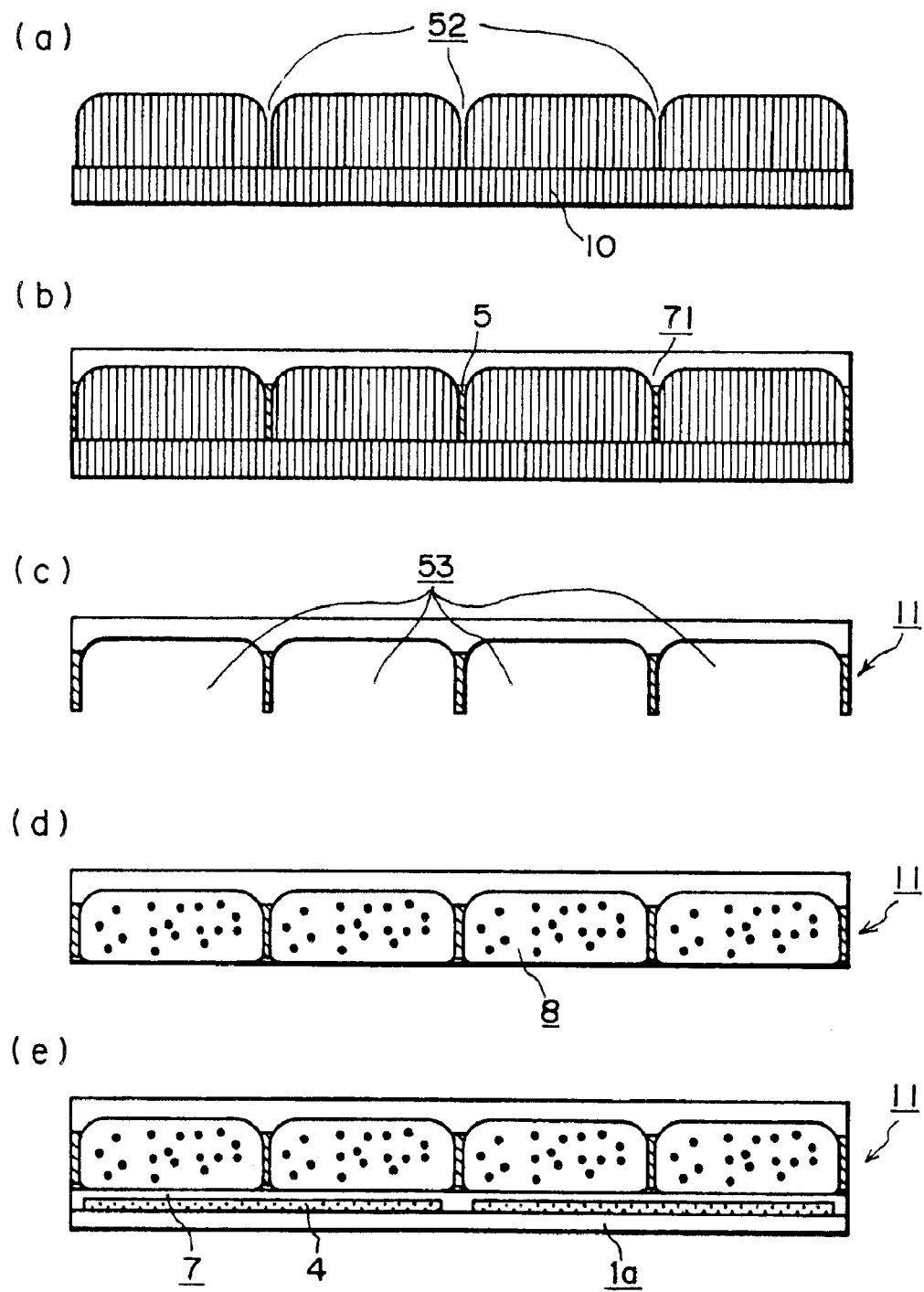
Figure 11:
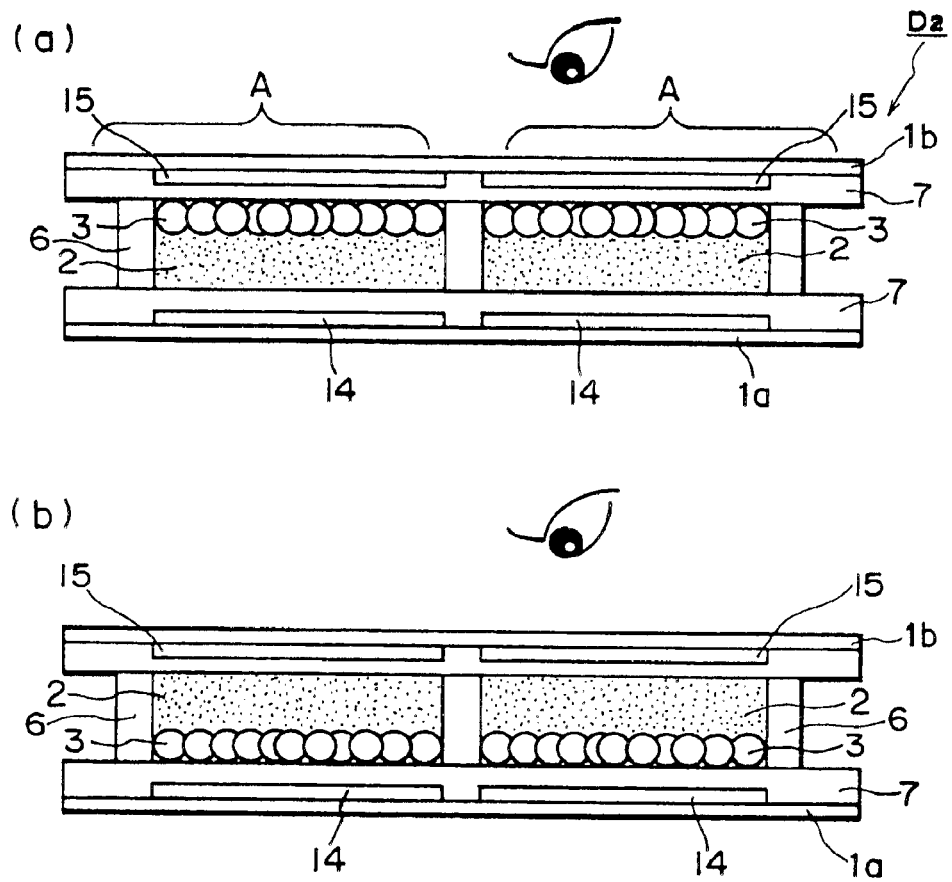
FIGS. 11(a) and 11(b) are schematic sectional views showing an embodiment of a conventional display apparatus (electrophoretic display).

Then, a structure 11 comprising the insulating layer 71 and the electroconductive layer 5 in lamination is removed from the mold substrate 10 (FIG. 10(c)).

Then, as a second step, in recessed portions 53 of the structure 11 prepared in the first step, the microcapsules 8 are disposed (FIG. 10(d)).

Then, as a third step, the structure 11 in which the microcapsules 8 are disposed is bonded to a first substrate 1a or which a first electrode 4 and an insulating layer 7 are formed in advance (FIG. 10(e)).

Incidentally, in the above-mentioned first step, before removing the structure 11, the first substrate on which the first electrode has been formed in advance may be disposed and bonded onto the insulating layer 71.

Figure 4:
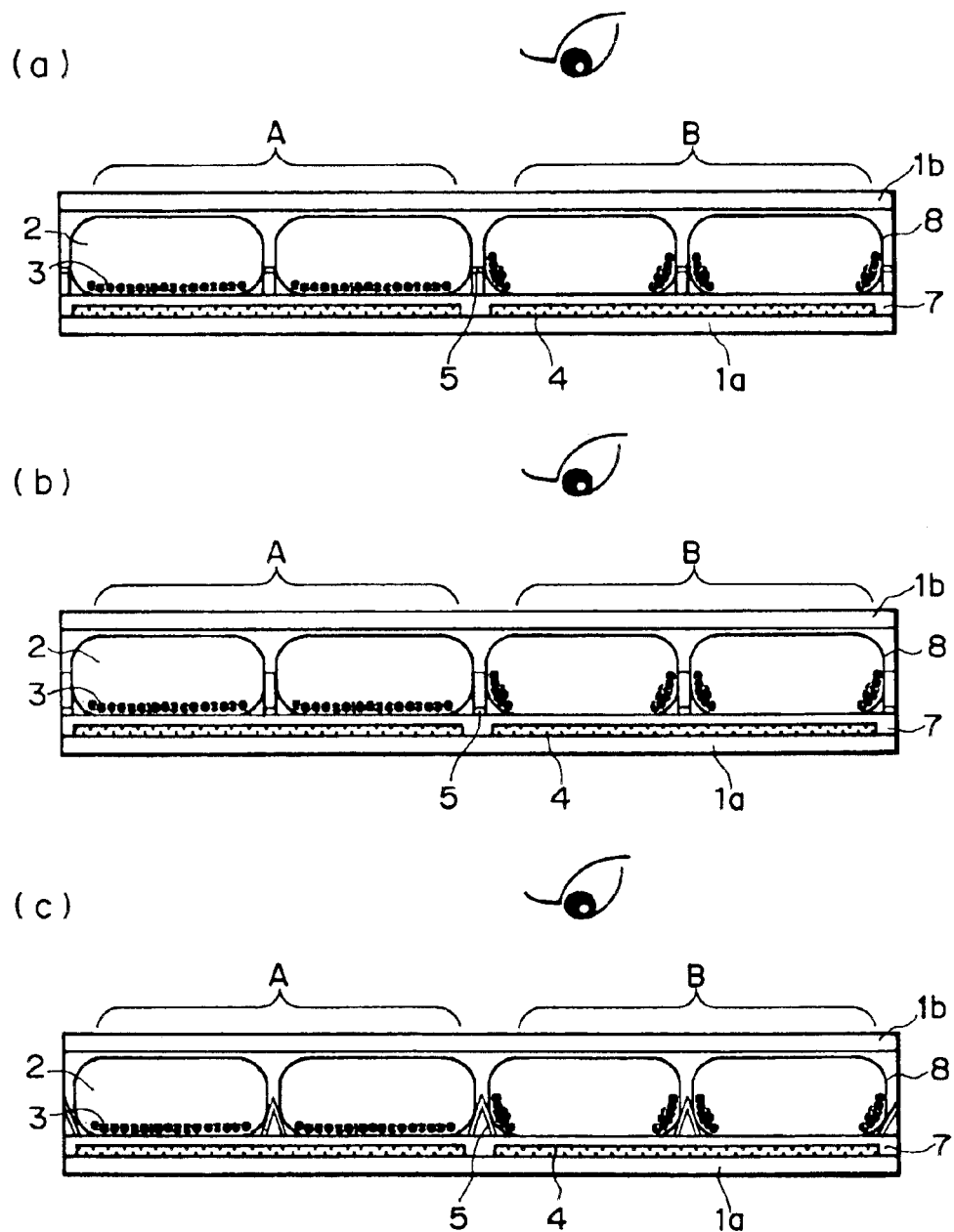

Further, in place of the first step described above, it is also possible to form the second electrode by patterning a lamination layer comprising the insulating layer 71 and the electroconductive layer 5 through a photolithographic process without using the mold substrate as described in Example 2 appearing hereinafter and removing the electroconductive layer by etching so as to only leave the second electrode portion. When the electroconductive layer is made thick, it is possible to form such a structure that the second electrode is protruded from the first substrate in a projected-shape as shown in FIG. 3(b). Further, in the third step, the structure is bonded to the second substrate provided with no electrode to prepare an electrophoretic display having a structure as shown in FIG. 3(b) or FIG. 4.

(Driving Method)

Next, an embodiment of a driving method for driving the electrophoretic display of the present invention will be described.

For example, the second electrode is grounded as a common electrode for all the pixels and a voltage is applied to the first electrode of each pixel, whereby it is possible to move the charged electrophoretic particles which have been electrically charged to a positive polarity or a negative polarity. When the charged electrophoretic particles are moved to a position which covers the first electrode, the color of the charged electrophoretic particles is visually recognized through the transparent insulating liquid. On the other hand, when the charged electrophoretic particles which have covered the first electrode are moved to the side wall surface side of a microcapsule where the microcapsule contacts or crates a space with its adjacent microcapsule, the color of the first display electrode or the first substrate is visually recognized.

According to the present invention, the second electrode is disposed in a space defined or enclosed by the outer surfaces of adjacent microcapsules and the upper and lower (second and first) substrates, and a voltage is applied between the first and second electrodes to cause the charged electrophoretic particles to migrate between the side wall portion of each microcapsule, i.e., the internal wall surface of each microcapsule an external (outer) surface of which does not contact both the first and second substrates, and the internal wall portion of each microcapsule an external surface of which contacts the first substrate. As a result, it becomes possible to effect high-contrast display.

Further, the second electrode disposed between adjacent microcapsules is grounded as the common electrode for all the pixels, whereby an electric field applied to each pixel (each microcapsule) can be prevented from leaking to its adjacent pixel (adjacent microcapsule). In other words, the second electrode functions as a shield electrode. As a result, the charged electrophoretic particles encapsulated in each microcapsule is controlled only by a voltage applied to the associated microcapsule without being adversely affected by a voltage applied to an adjacent microcapsule, thus realizing stable display without causing display disorder or lowering in contrast. The above-mentioned shield effect of the second electrode becomes noticeable in such a structure that the electroconductive member is filled in the space between adjacent microcapsules as shown in FIG. 1, and is one of significant characteristic features of the electrophoretic display according to the present invention.

Hereinbelow, the present invention will be described more specifically based on Examples.

EXAMPLE 1

Figure 7:
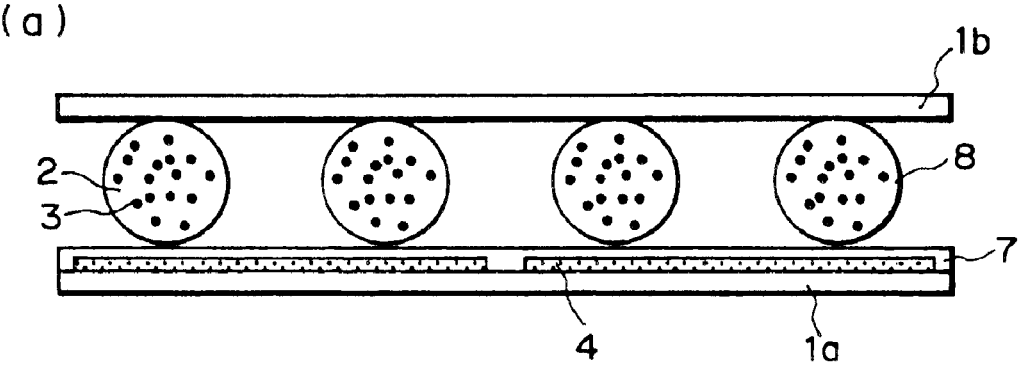
FIGS. 7(a)–7(d), 8(a) and 8(b), 9(a)–9(c), and 10(a)–10(e) are respectively schematic sectional views for illustrating an embodiment of a representative production method of the electrophoretic display of the present invention.
Figure 7:
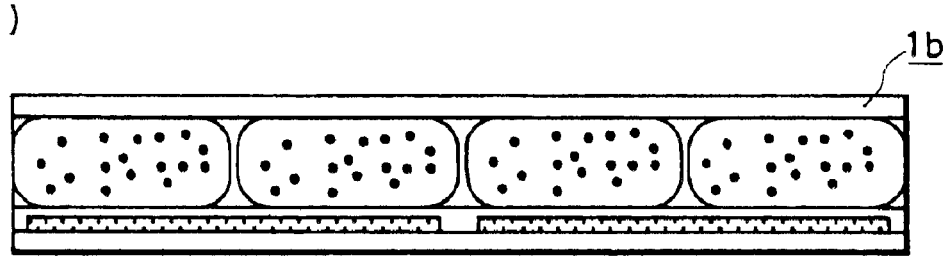
Figure 7:
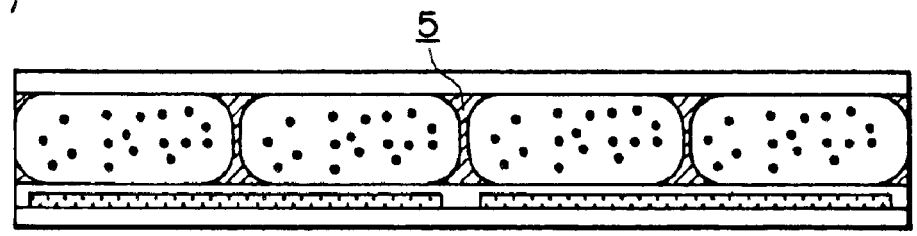
Figure 7:
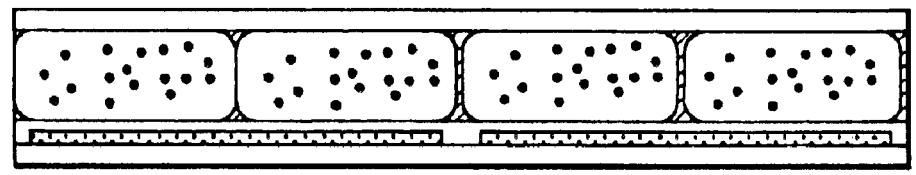

An electrophoretic display having a structure shown in FIG. 1 was prepared by the above-mentioned first production process shown in FIG. 7.

The size of each (one) pixel was set to 100 $\mu$m×100 $\mu$m.

As a first substrate 1a, an aluminum thin film was formed on a surface of a (200 $\mu$m-thick) PET film, followed by patterning through a photo-lithographic or wet etching process to form a plurality of first electrodes 4. White coloring layers were formed so as to cover these first electrodes 4. These white coloring layers 4 were formed of an acrylic resin and a white pigment, such as titanium oxide (used in this example) or alumina, dispersed in the acrylic resin.

Then, an insulating layer 7 of an acrylic resin was formed so as to cover the white coloring layers.

Microcapsules 8 were prepared by a combined coacervation method. As an insulating liquid 2, isoparaffin (trade name: "Isopar", mfd. by Exxon Corp.) was used, and as charged electrophoretic particles 3, particles of polystyrene-polymethyl methacrylate copolymer resin containing carbon black and having a particle size of ca. 1–2 $\mu$m were used. In the isoparaffin, succinimide (trade name: "OLOA 1200", mfd. by Shevron Corp.) was contained. The resultant charged electrophoretic particles 3 exhibited a positive chargeability.

Then, by using a roll coater, the microcapsules 8 were arranged on the first substrate 1a and were flattened, while being sandwiched between the first substrate 1a and a second substrate 1b (200 $\mu$m-thick PET film) with a roll laminator, by applying an appropriate pressure between the first and second substrates 1a and 1b, so as to bring each microcapsule near to its adjacent microcapsule.

Then, a space between the respective adjacent microcapsules was filled with an electroconductive member by utilizing capillary action to form a second electrode 5. As the electroconductive member, an electroconductive polymeric material containing metal (used in this example), metal oxide, polypyrrole, polyaniline, polythiophene, its derivative, etc., was used.

A display operation was performed by using the thus-prepared electrophoretic display to measure a display characteristic. More specifically, a voltage applied to the second electrode 5 as a common electrode for all the pixels was set to 0 V, and a voltage applied to the first electrode 4 for each pixel was fluctuated between ±20 V. As a result, a good and stable black-and-white (monochrome) display characteristic was obtained. Further, it was also confirmed that a fluctuation in contrast was not observed and a stable display contrast was achieved even when different black and white display states were employed between adjacent pixels.

EXAMPLE 2

An electrophoretic display having a structure shown in FIG. 3(b) was prepared in the following manner.

The size of each (one) pixel was set to 180 $\mu$m×180 $\mu$m.

As a first substrate 1a, an aluminum thin film was formed on a surface of a (180 $\mu$m-thick) PES film, followed by patterning through a photo-lithographic or wet etching process to form a plurality of first electrodes 4. White coloring layers were formed so as to cover these first electrodes 4. These white coloring layers 4 were formed of an acrylic resin and a white pigment, such as titanium oxide (used in this example) or alumina, dispersed in the acrylic resin.

Then, an insulating layer 7 of an acrylic. resin was formed so as to cover the white coloring layers.

Onto the entire surface of the insulating layer 7, an electroconductive resist was applied, followed by patterning in a shape shown in FIG. 3(b) to form a second electrode having a width of 5 $\mu$m and a height of 15 $\mu$m. As the electroconductive resist, it is possible to use these containing, as a skeleton (main chain) or a side chain, an electroconductive polymeric substance such as thiophene, acetylene pyrrole thiazyl, azulene, indene, indole, p-phenylene, naphthylene, anthracene, aniline, phthalocyanine, carbazole ferrocene,TCNQ complex and their derivatives. In this example, thiophene was used.

Microcapsules 8 were prepared in the same manner as in Example 1.

By using an ink jet method, as shown in FIG. 3(b), the microcapsules 8 were positioned in alignment with the position of the first electrodes 4. At this time, based on the projection-shaped second electrode 5, it was possible to enhance an efficiency of accommodating the microcapsules 8 in a predetermined position. Thereafter, a second substrate 1b (180 $\mu$m-thick PES film) was disposed opposite from the first substrate 1a, and an appropriate pressure was applied between the first and second substrates 1a and 1b to flatten the microcapsules 8.

A display operation was performed by using the thus-prepared electrophoretic display to measure a display characteristic. More specifically, a voltage applied to the second electrode 5 as a common electrode for all the pixels was set to 0 V, and a voltage applied to the first electrode 4 for each pixel was fluctuated between ±20 V. As a result, a good and stable black-and-white (monochrome) display characteristic was obtained. Further, it was also confirmed that a fluctuation in contrast was not observed and a stable display contrast was achieved even when different black and white display states were employed between adjacent pixels.

EXAMPLE 3

Figure 9:
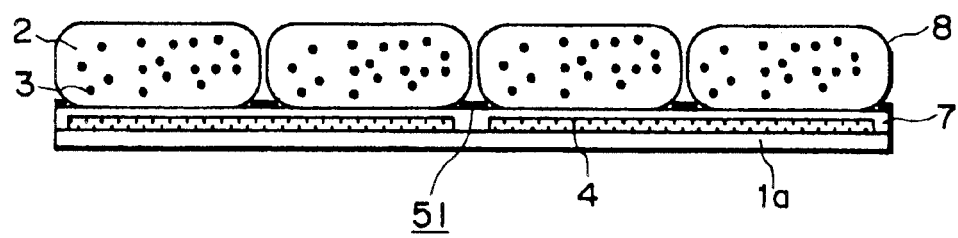
Figure 9:
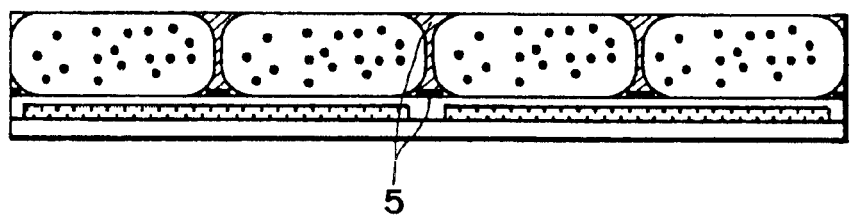
Figure 9:
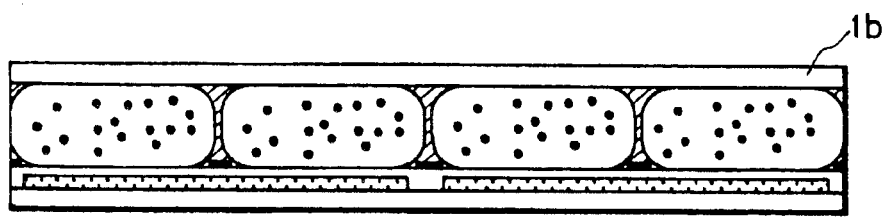

An electrophoretic display having a structure shown in FIG. 3(c) was prepared by the fifth production process shown in FIG. 9.

The size of each (one) pixel was set to 180 $\mu$m×180 $\mu$m.

As a first substrate 1a, an aluminum thin film was formed on a surface of a (1.1 mm-thick) glass substrate, followed by patterning through a photo-lithographic or wet etching process to form a plurality of first electrodes 4. White coloring layers were formed so as to cover these first electrodes 4. These white coloring layers 4 were formed of an acrylic resin and a white pigment, such as titanium oxide (used in this example) or alumina, dispersed in the acrylic resin.

Then, an insulating layer 7 of an acrylic resin was formed so as to cover the white coloring layers.

Then, on the surface of the insulating layer 7, an ITO (indium tin oxide) film was formed, followed by patterning through a photolithographic or wet etching process to form a plating electrode 51 having a width of 5 $\mu$m.

Microcapsules 8 were prepared in the same manner as in Example 1 and were encapsulated between the first substrate 1a and a second substrate 1b (1.1 mm-thick glass substrate), followed by flattening of the microcapsules 8 by applying an appropriate pressure between the first and second substrates 1a and 1b.

Then, the second substrate 1b was once removed, and an electroconductive member 5 for forming a second electrode was formed in the space between adjacent microcapsules by electroplating with the plating electrode 51. Thereafter, the second substrate 1b was again bonded to the resultant structure.

A display operation was performed by using the thus-prepared electrophoretic display to measure a display characteristic. More specifically, a voltage applied to the second electrode 5 as a common electrode for all the pixels was set to 0 V, and a voltage applied to the first electrode 4 for each pixel was fluctuated between ±20 V. As a result, a good and stable black-and-white (monochrome) display characteristic was obtained. Further, it was also confirmed that a fluctuation in contrast was not observed and a stable display contrast was achieved even when different black and white display states were employed between adjacent pixels.

As described hereinabove, according to the present invention, it is possible to produce an electrophoretic display which is excellent in display stability and is capable of realizing high-contrast display.

What is claimed is:

1. An electrophotographic display, comprising:
   a plurality of microcapsules each having an internal surface and an external surface and encapsulating therein an insulating liquid and a plurality of charged electrophoretic particles dispersed in the insulating liquid;
   a first substrate and a second substrate disposed opposite to each other so as to sandwich said plurality of microcapsules; and
   a first electrode disposed on the first substrate and an electroconductive member as a second electrode,
   wherein said electroconductive member at least partially fills a space defined by the first and second substrates and the external surfaces of adjacent microcapsules, and said charged electrophoretic particles move between a first internal wall portion of each microcapsule the external surface of which contacts said first electrode and a second internal wall portion of each microcapsule the external surface of which contacts said second electrode, thereby to switch a display state.

2. A display according to claim 1, wherein said plurality of electrodes comprise a first electrode disposed along said first substrate and a second electrode which is electrically isolated from the first electrode and in disposed at least a part of a space enclosed with said first and second substrates and the surfaces of microcapsules.

3. A display according to claim 2, wherein the second electrode is filled in at least a part of the space.

4. A display according to claim 2, wherein the second electrode comprises an electroconductive member and is filled in at least a part of the space.

5. A display according to claim 4, wherein the electroconductive member comprises a liquid.

6. A display according to claim 4, wherein the electroconductive member comprises a metal.

7. A display according to claim 2, wherein the second electrode is formed and disposed on the first substrate or the second substrate in the form of a projection.

8. A display according to claim 2, wherein the second electrode is formed and disposed on an upper or lower surface or within a member which is formed on the first substrate or the second substrate in the form of a projection.

9. A display according to any claim 2, wherein each microcapsule has a flattened shape.

10. A display according to claim 2, wherein each microcapsule has a flattened and rectangular shape and is in surface contact with the first electrode.

11. A display according to claim 2, wherein said microcapsules are disposed on a random basis irrespective of a position of the first electrode.

12. A display according to claim 2, wherein each microcapsule is disposed in alignment with a position of the first electrode.

13. A display according to claim 2, wherein the first electrode has a projected surface toward the second substrate.

14. A display according to claim 2, wherein the second electrode is a common electrode for all pixels.

15. A display according to claim 2, wherein a third electrode disposed on the second substrate.

16. A display according to claim 2, wherein the display has a plurality of pixels each comprising a plurality of microcapsules, and the second electrode is disposed at a boundary between mutually adjacent two pixels.

17. A process for producing an electrophoretic display including a plurality of microcapsules each encapsulating therein an insulating liquid and a plurality of charged electrophoretic particles disposed in the insulating liquid, a first substrate and a second substrate disposed opposite to each other so as to sandwich the plurality of microcapsules, a first electrode disposed along the first substrate and a second electrode which is electrically isolated from the first electrode and is disposed at least a part of a space enclosed with the first and second substrates and the surfaces of microcapsules; said process comprising:
   (1) a step of forming the first electrode on the first substrate,
   (2) a step of disposing the plurality of microcapsules on the first or second substrate,
   (3) a step of disposing the first and second substrate so as to sandwich the plurality of microcapsules, and
   (4) a step of at least partially filling the space defined by the first and second substrates and external surfaces of adjacent microcapsules with an electroconductive member thereby forming the second electrode before or after the step (3).

18. A process according to claim 17, wherein the step (4) of forming the second electrode is performed after the step (3) and includes a step of incorporating an electroconductive member in a space between the first and second substrates.

19. A process according to claim 17, wherein the step (4) of forming the second electrode is performed after the step (3) and includes a step of injecting an electroconductive member in the space between adjacent microcapsules from in injection port disposed in a position where the injection port contacts the space.

20. A process according to claim 17, wherein the step (4) of forming the second electrode is performed before the step (3) and includes a step of disposing each microcapsule between adjacent second electrodes formed on the first and second substrates in the form of a projection.

21. A process according to claim 17, wherein the step (4) of forming the second electrode is performed before the step (3) and includes a step of forming the second electrode in the space between adjacent microcapsules by electroplating.

22. A process according to claim 17, wherein the process further comprises, after the step (3), a step of flattening the microcapsule by applying a pressure to the first and second substrates.

23. A process for producing an electrophoretic display including a plurality of microcapsules each encapsulating therein an insulating liquid and a plurality of charged electrophoretic particles dispersed in the insulating liquid, a first substrate and a second substrate disposed opposite to each other so as to sandwich the plurality of microcapsules, a first electrode disposed along the first substrate and a second electrode which is electrically isolated from the fist electrode and is disposed at least a part of a space enclosed with the first and second substrates and the surfaces of microcapsules; said process comprising:

- a first step of preparing a laminated structure including an insulating layer and a projection-shaped electroconductive member, as the second electrode, disposed on the insulating layer by at least partially filling a recess of mold substrate with the electroconductive member, laminating the insulating layer on the electroconductive member, and removing the laminated structure front the mold substrate,
- a second step of disposing the plurality of microcapsules so that the projection-shaped electroconductive member is located between adjacent microcapsules, and
- a third step of bonding the first and second substrates to each other by using the laminated structure, in which the microcapsules are disposed, as the first or second substrate.

\* \* \* \* \*